United States Patent [19]

Gransberry et al.

[11] 4,289,288
[45] Sep. 15, 1981

[54] WIRE ROUTING APPARATUS

[75] Inventors: N. Keith Gransberry, Birdsboro; Allen C. Haggerty, Media, both of Pa.

[73] Assignee: The Boeing Company, Seattle, Wash.

[21] Appl. No.: 947,345

[22] Filed: Oct. 2, 1978

[51] Int. Cl.$^2$ .............................................. F16L 5/00
[52] U.S. Cl. ................................ 248/56; 174/153 G; 339/103 B
[58] Field of Search ............. 16/2; 174/152 R, 152 G, 174/153 R, 153 G; 248/56; 339/103 B, 103 C

[56] References Cited

U.S. PATENT DOCUMENTS

| | | | |
|---|---|---|---|
| 3,562,847 | 2/1971 | Jemison | 174/153 G |
| 3,643,290 | 2/1972 | Milne | 248/564 R |
| 3,889,909 | 6/1975 | Koscik | 248/56 |

*Primary Examiner*—James C. Mitchell
*Attorney, Agent, or Firm*—Robert S. Lipton; Jack D. Puffer

[57] ABSTRACT

A split ring grommet for use in routing electrical cables, and the like, through aircraft bulkheads is disclosed. The grommet has a flange which is formed at one end thereof and tabs on its outer surface. The grommet is designed so that when it is inserted into the hole in a bulkhead the tab and flange engage the edge of the bulkhead which forms the periphery of the hole. A clamp is provided for securing the opposing faces of the split ring grommet. The clamp slips over the non-flanged end of the grommet and has locking members which fit into slots in the grommet on either side of the opposing faces. The tabs and locking members are spring biased so as to insure a tight fit between the grommet and the bulkhead. Electrical cables, hydraulic tubing and the like are secured by straps which engage both the cables and the grommet.

6 Claims, 4 Drawing Figures

WIRE ROUTING APPARATUS

BACKGROUND OF THE INVENTION

1. Field of the Invention

This invention relates generally to improvements in devices used in the field of wiring and cabling. In particular, the invention relates to devices used in distributing electronic and electrical and hydraulic components, as well as hydraulic lines, through various structures such as aircraft bulkheads. Numerous holes are formed in internal walls or bulkheads of aircraft and in their primary load carrying structural members. Such holes are formed for the purpose of reducing the weight of the aircraft or for the express purpose of permitting electrical cables, hydraulic lines and the like to pass therethrough. The invention is an improvement to devices or apparatus which are connected to the edge of the bulkheads which form the periphery of the hole to prevent wire and tube chafing and to which the electrical cables are attached.

2. Description of the Prior Art

Wire routing devices are well known in the prior art. One of the simplest devices used for this purpose is a plain rubber grommet having a groove in its outer surface for engaging the edge of a bulkhead forming the periphery of a hole. Devices of this type are used to protect the wiring from the sharp edges of the bulkhead and are not used to secure wire cables. Such grommets are commonly found in automobile firewalls.

A split ring grommet or bushing, similar to the automobile type just discussed, is disclosed in U.S. Pat. No. 3,562,847 issued to Jemison on Mar. 4, 1960. Here, the grommet is split so that when in place it has two opposing faces. This facilitates installation of the grommet in the hole.

A bifurcated split ring grommet is disclosed in U.S. Pat. 3,889,909 issued to Koscik on June 17, 1975. A flange and tab are disclosed for engaging a bulkhead edge forming the periphery of a hole. The grommet is adapted to have a single cable attached or secured to it.

There have been various problems associated with the wire routing grommets of the prior art, particularly for aircraft use. It is desirable that routing grommets for aircraft use be easily and simply inserted into the lightening holes of the aircraft prior to the installation of electrical cables, so as to prevent damaging of the insulation on the cables while they are being passed through the holes. Such grommets must provide an abrasion resistant capability so as to prevent degradation of the structural integrity of the cable sheath or wire insulation. It is desirable that a number of cables be attached to a single grommet in a secure manner though as to reduce the number of holes required and to permit optimum placement of the holes which are required. It is highly desirable that the grommet be tightly secured to the bulkhead, particularly in aircraft where vibration is a significant factor and can cause damage to the electrical cables by breaking the protective insulation.

SUMMARY OF THE INVENTION

The device of the present invention includes a split ring grommet having a outwardly extending flange at one end. A plurality of tabs are spaced about the outer surface of the grommet facing the flange. When in place the edge of the bulkhead is secured between the flange and the tabs. The tabs have a sloping face and are spring biased so as to tightly engage the bulkhead. The device may be secured to bulkheads having flanged edges by appropriately mating the flanged bulkhead with the flange on the grommet.

A series of slots are formed in the grommet so that they are substantially perpendicular to the cross sectional plane of the grommet. Straps passing through the slots are used to secure electrical cable, wire bundles, hydraulic lines, and the like to the inner face of the grommet.

A clamp, having a U-shaped cross section is provided to engage the cylindrical end of the grommet opposite the flanged end so as to keep the opposed faces of the split ring aligned. A lock is connected to the clamp to prevent lateral motion of the clamp with respect to the grommet. Tabs are formed on the lock which are inserted into slots in the grommet to secure it thereto. The tabs are spring biased so as to force the opposed faces of split ring grommet apart causing it to tightly engage the bulkhead by increasing the diameter of the grommet.

An object of this invention is to provide a wire and tube routing apparatus which is adapted to connect a number of wire bundles or cables or hydraulic tubing through a wall to which the device is adapted to be connected.

Another object of the invention is to provide a split ring grommet which is adapted to connect a number of wire bundles or hydraulic tubing through a wall through which the wire bundles pass, and to which the split ring grommet is adapted to be tightly connected.

A further object of the present invention is to provide a split ring grommet, of type described herein, which is adapted to be simply, rapidly and tightly connected to the edges of the bulkhead which form the periphery of a hole therein.

Another object of the present invention is to provide a split ring grommet, of the type described herein, which is adapted to rigidly secure electrical cables and wire bundles and tubes to a bulkhead, through which they pass, in such a manner so as to substantially eliminate wear caused by vibration.

Still another object of the present invention is to provide a split ring grommet, of the type described herein, which is adapted to be tightly connected to the flanged edge of a bulkhead which forms a hole therein.

A further object of the present invention, is to provide a split ring grommet for securing cables or tubes to a bulkhead, through which they pass, which includes a clamp for securing the abutting faces of the split ring grommet to one another which simply and rapidly is attachable to the grommet and securely fixed to the grommet in a vibratory environment.

Many other objects, features and advantages of this invention will be more fully realized and understood from the following detailed description when taken in conjunction with the accompanying drawings wherein like numerals throughout the various use of the drawings are intended to designate like or similar elements or components.

BRIEF DESCRIPTION OF THE DRAWINGS

In the drawings, in which like numerals refer to like parts.

DESCRIPTION OF THE PREFERRED EMBODIMENT

Figure 1:
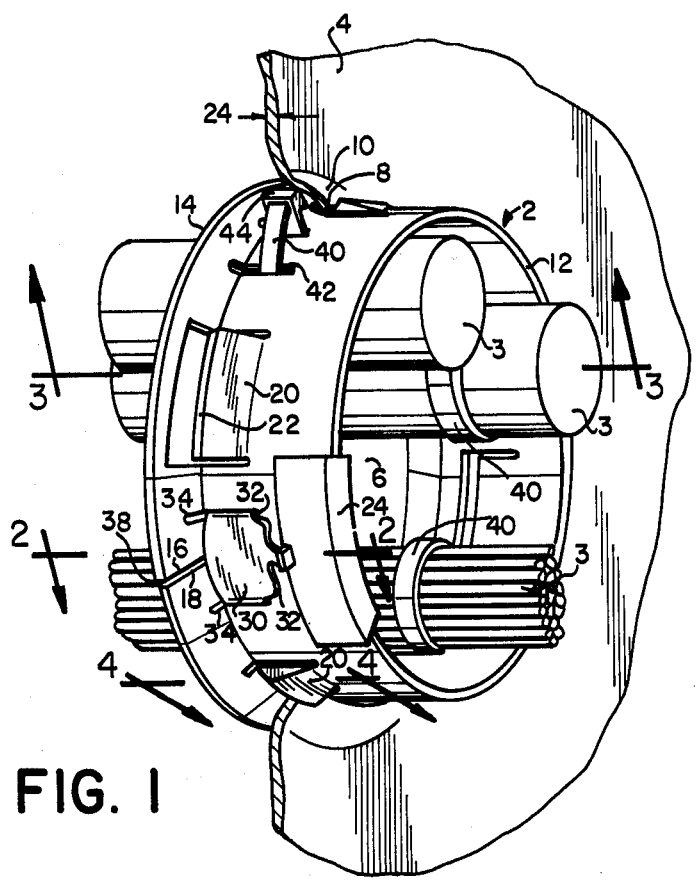
FIG. 1 is a perspective view of the present invention connected to a bulkhead, partially broken away.

Referring now to FIG. 1 there is seen a split ring grommet 2 of the present invention. The grommet 2 is shown connected to a wall or bulkhead 4, a hole or aperture 6 is formed in the bulkhead 4. The bulkhead 4 has a circular edge 8 which forms the periphery of the hole 6. A flange 10 has been formed in the bulkhead 4 at the periphery of hole 6.

The split ring grommet 2 is cylindrical in shape and has a straight end 12 and a flanged end 14. The flange 14 is an integral part of the split ring grommet 2. The grommet 2 has been split and has opposing faces 16 and 18. The split extends along the longitudinal axis of the grommet 2 from the flange 14 to the opposite end 12. Four tabs 20 have been formed in the grommet 2 which are equally spaced about the circumference of the grommet 2. The tabs 20 together with the flange 14 are adapted to engage the bulkhead 4.

In the preferred embodiment of the invention the flange 14 is positioned at a 45 degree angle with respect to the cross sectional plane of the grommet 2. The grommet 2 may be connected to the bulkhead provided that the flange 10 does not have an angle between the flange and the surface of the bulkhead 4 greater than 45 degrees. Of course, the grommet 2 may be connected to a bulkhead 4 which has no flange. In the event the bulkhead flange 10 is at an angle greater than 45 degrees other embodiments of the invention may be designed having a flange 14 with a compatible flange angle.

Figure 4:
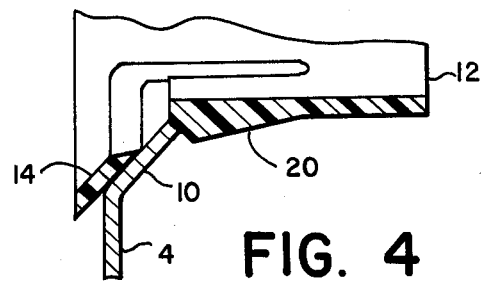
FIG. 4 is a section view taken along line 4—4 of FIG. 1, showing the grommet connected to the bulkhead.

A self-tightening feature is provided which may be seen in FIGS. 1 and 4. When the grommet 2 is inserted in the hole 6 the edge 8 of the bulkhead 4 sits between the flange 14 and the tab 20. The tab 20 has a sloping surface 22. The gap between the flange 14 and the tabs 20 is less than the thickness 24 of the bulkhead 4. Thus, when the grommet 2 properly engages the bulkhead 4 the tabs 20, which are spring biased, are depressed inward thereby providing spring biased engagement of the bulkhead 4. The spring biasing of the tabs 20, coupled with the sloping face 22 also serves to permit self-tightening where there are variations between the outer diameter of the grommet 2 and the diameter of the hole 6.

A clamp 24 is provided to secure faces 16 and 18. As may be seen in FIG. 2 the clamp 24 has a U-shaped component which slips over end 12 of the grommet 2. The grommet 2 in the area covered by the clamp 20 has a tab 26 which fits into a recess 28 in the clamp 24. The engagement of the tab 26 and the recess 28 provides a snap-on locking mechanism for keeping the clamp 24 engaged to the grommet 2.

A spring biased lock connector 30 is connected to the clamp 24. In the preferred embodiment of the invention the lock connector 30 is integrally formed as a part of the clamp 24. The lock connector 30 has tabs 32 which form an integral part thereof. The tabs 32 are inserted into slots 34 in the grommet 2. Grooves 36 are formed on the tabs 32 to engage the edges of the slots 34, thus keeping the lock connector 30 positioned within the slots 34. The lock connector 30 prevents the clamp 24 from moving along the edge 12 of the grommet 2.

In addition to the tabs 20 the lock 30 serves as an additional mechanism for keeping the grommet 2 tightly engaged to the bulkhead 4. The lock 30 is spring biased so that the tabs 32 spring outward thus tending to form a gap 38 between the faces 16 and 18 of the grommet 2. This serves to force the outer surface of the grommet 2 against the edge 8 of the bulkhead 4.

Figures 2, 3:
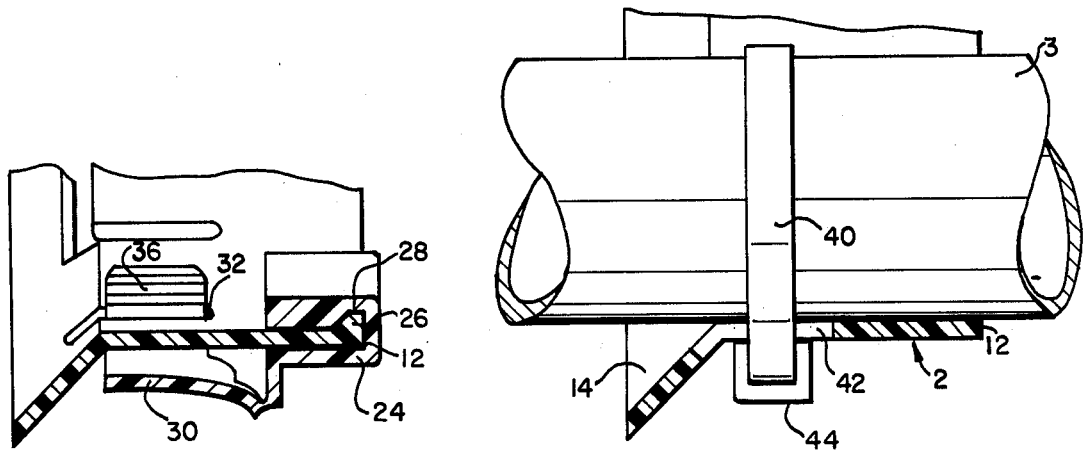
FIG. 2 is a section view taken along lines 2—2 in FIG. 1, showing a cross section of the clamp and lock.
FIG. 3 is a section view taken along lines 3—3 in FIG. 1, showing a hydraulic line secured to the grommet.

Straps 40 secure the wire bundles, electrical cables, or hydraulic lines 3 securely to the grommet 2, as is shown in FIG. 3. The straps 40 securely engage the cables and pass through slots 42 in the grommet 2. The straps are locked conventionally by a lock 44 which forms an integral part thereof. The number of cables 3 which may be secured to the grommet 2 is limited only by the number of slots which may be formed in the grommet 2, the diameter of the grommet, and the diameter of the cables 3.

The material from which the split ring grommet 2 is constructed, must be carefully selected. The material must possess an appropriate degree of flexibility or spring constant so that the tabs 20 will be properly spring biased. In addition to maintaining its spring constant, the material must have a low coefficient of expansion and resist cracking through the large range of temperatures normally encountered in aircraft usage. The material used in the preferred embodiment is a composite nylon and glass manufactured by Du Pont and known as 801 ST.

The clamp 24 and lock 30 must be made of a similar material. However, the clamp and lock must be made of a material which is substantially more flexible, so that it may snapably engage the grommet 2. Additionally, it should have a low coefficient of friction so as to permit easier engagement of the grommet. In the preferred embodiment of the invention the clamp and lock are made of a nylon material known as Rislan Nylon 11 manufactured by Rislan Corp.

While the split ring grommet of the present invention, has been illustrated and disclosed with reference to a preferred embodiment it is to be understood that various changes and modifications may be made within the scope and spirit of the invention.

What is claimed is:

1. A routing apparatus for connecting cables and the like to a wall having a hole therein, which comprises:
    a split ring grommet having a slit along its longitudinal axis which includes, a cylindrical body having a flange at one end thereof, an edge at the opposite end thereof, and spring biased means for engaging the wall between said spring biased means and said flange;
    means, operably connected to said grommet, for securing the portions of the grommet opposing said slit to one another;
    means, operably connected to said grommet, for increasing the diameter of said grommet by increasing the width of said slit which includes a spring biased member having opposing ends which are inserted into first slots in said grommet, said spring biased member being positioned to over-lap said slit; and
    means, operably connected to said grommet, for connecting the cables and the like to the inner portion of said cylinder.

2. The apparatus of claim 1 wherein said securing means includes a U-shaped clamp which is adapted to be positioned over said edge of said grommet.

3. The apparatus of claim 2 wherein said clamp has a recess adapted to receive a tab connected to said grommet thereby preventing movement of said clamp with respect to said grommet along the longitudinal axis of said grommet.

4. The apparatus of claim 2 wherein said ends of said spring biased member have grooves therein for engaging the edges of said grommet which form said first slots.

5. The apparatus of claims 1, 2, 3, or 4 wherein said grommet includes a plurality of second slots, and wherein said means for connecting the cables includes a strap adapted to pass through a pair of said second slots and about a cable, said strap including a locking means to secure its opposite ends to one another, thereby securing the cable to said grommet.

6. The apparatus of claims 1, 2, 3, or 4 wherein said diameter increasing means is connected to said securing means thereby preventing said securing means from moving circumferentially with respect to said grommet.

* * * * *